United States Patent
Di Vitto

(10) Patent No.: US 9,475,532 B2
(45) Date of Patent: Oct. 25, 2016

(54) VARIABLE-ATTITUDE SYSTEMS FOR TRAINING WHEELS FOR BICYCLES AND MINI-MOTORCYCLES

(71) Applicant: MONTECARLO LOOK S.r.l., S. Zeno, Brescia (IT)

(72) Inventor: Andrea Di Vitto, Brescia (IT)

(*) Notice: Subject to any disclaimer, the term of this patent is extended or adjusted under 35 U.S.C. 154(b) by 48 days.

(21) Appl. No.: 14/410,701

(22) PCT Filed: Jul. 12, 2013

(86) PCT No.: PCT/IB2013/055753
§ 371 (c)(1),
(2) Date: Dec. 23, 2014

(87) PCT Pub. No.: WO2014/009925
PCT Pub. Date: Jan. 16, 2014

(65) Prior Publication Data
US 2015/0123388 A1    May 7, 2015

(30) Foreign Application Priority Data
Jul. 12, 2012 (IT) .............................. BS2012A0108
Jul. 11, 2013 (IT) .............................. BS2013A0103

(51) Int. Cl.
*B62H 1/12* (2006.01)
*B62H 1/10* (2006.01)
*B62H 7/00* (2006.01)

(52) U.S. Cl.
CPC *B62H 1/12* (2013.01); *B62H 1/10* (2013.01); *B62H 7/00* (2013.01)

(58) Field of Classification Search
CPC ............. B62H 1/12; B62H 1/10; B62H 7/00
USPC ........................................................ 280/293
See application file for complete search history.

(56) References Cited

U.S. PATENT DOCUMENTS

| 2,793,877 | A | 5/1957 | Meier, Jr. |
| 3,877,727 | A | 4/1975 | Johannsen |
| 5,064,213 | A | 11/1991 | Storch |
| 5,100,163 | A | 3/1992 | Egley |
| 5,352,403 | A | 10/1994 | Egley |
| 6,331,012 | B1 | 12/2001 | Eisenmann, II et al. |
| 7,641,213 | B1 * | 1/2010 | Chen ................. B62H 1/12 280/293 |

FOREIGN PATENT DOCUMENTS

| FR | 922237 A | 6/1947 |
| GB | 265490 A | 2/1927 |
| WO | 9509759 A1 | 4/1995 |
| WO | 9804452 A1 | 2/1998 |
| WO | 2005061317 A1 | 7/2005 |

* cited by examiner

*Primary Examiner* — Joseph Rocca
*Assistant Examiner* — Michael Stabley
(74) *Attorney, Agent, or Firm* — Mark David Torche; Patwrite LLC

(57) ABSTRACT

Variable-attitude systems used with training wheels for children's bicycles and mini-motorcycles are provided, which include a metal arm, mounted on a bicycle or mini-motorcycle frame, by a second metal arm and by a hinge joint, wherein elastic elements are provided, housed around the joint which, through the two arms thereof, imparts a pressure which may be modulated on the second arm which supports the training wheels to adhere to the sliding plane.

9 Claims, 5 Drawing Sheets

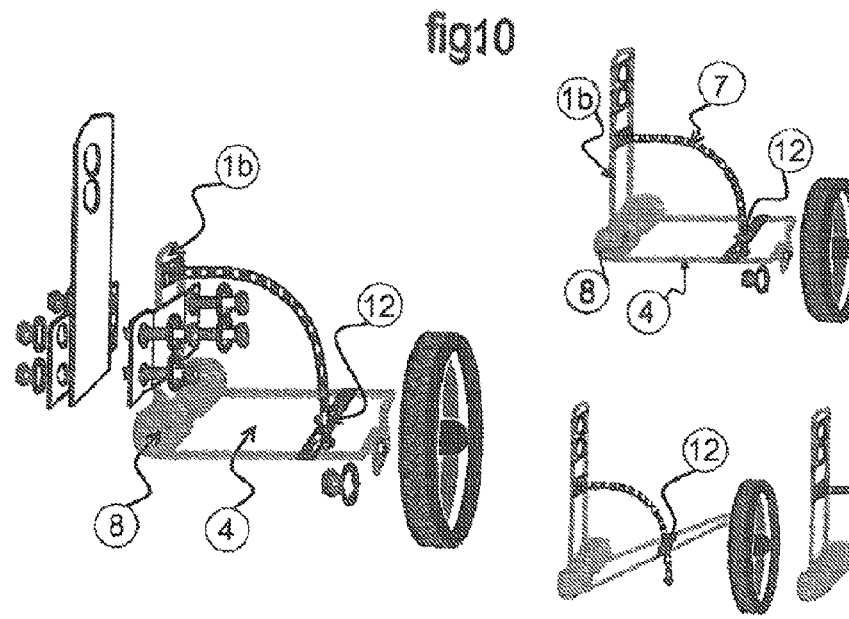
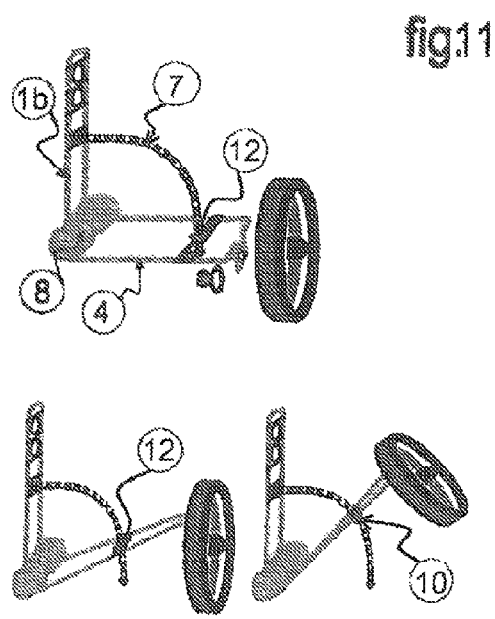
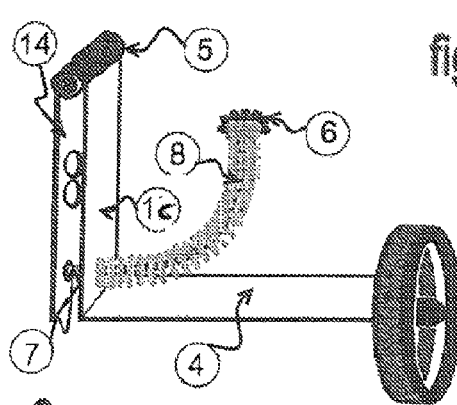
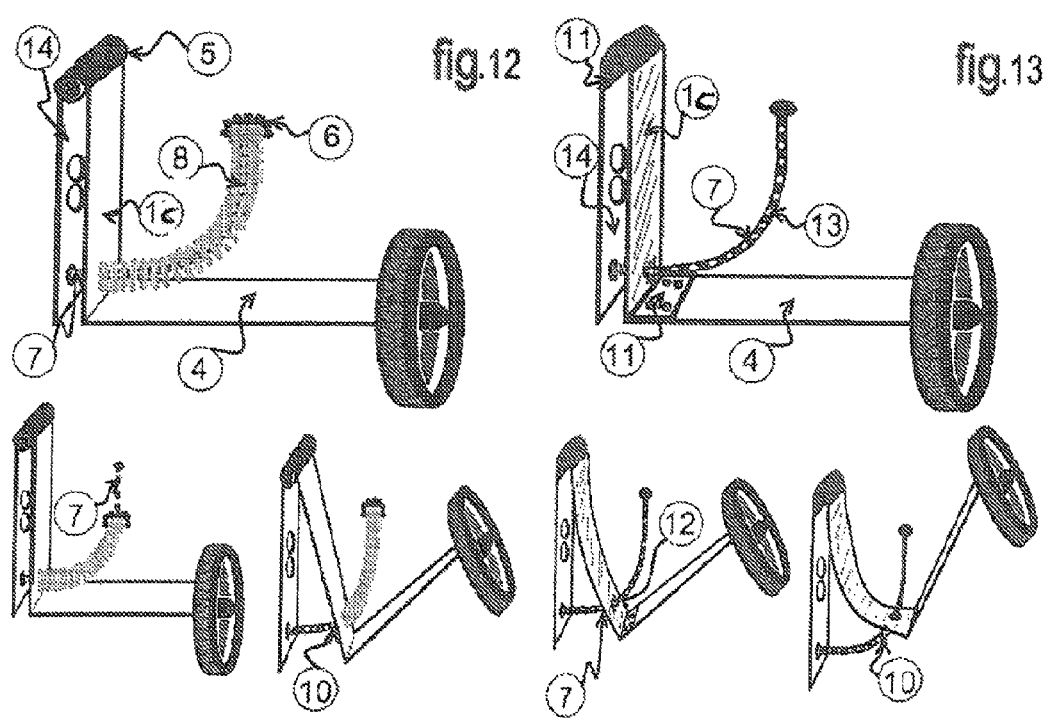

VARIABLE-ATTITUDE SYSTEMS FOR TRAINING WHEELS FOR BICYCLES AND MINI-MOTORCYCLES

CROSS-REFERENCE TO RELATED APPLICATIONS

This application is a National Phase Application of PCT International Application No. PCT/IB2013/055753, International Filing Date, Jul. 12, 2013 claiming priority to Italian Patent Application No. BS2012A000108, filed Jul. 12, 2012 and to Italian Patent Application No. BS2013A000103, filed Jul. 11, 2013, each of which is hereby incorporated by reference in its entirety.

FIELD OF THE INVENTION

The present invention refers to a variable-attitude system, applicable to children's trainer wheels of bicycles and mini-motorcycles, useful in particular to acquire balance and independence when riding such vehicles.

BACKGROUND OF THE INVENTION

Learning to ride 2-wheel vehicles, specifically bicycles and mini-motorcycles, represents a very important step in a child's life. Although riding such vehicles is per se relatively easy, the child has, when he/she begins to learn, neither the necessary sense of balance, nor an even intuitive knowledge of which variables he/she must adjust to be able to maintain the desired riding conditions. As a proof thereof, being able to ride a bicycle is in common use the paradigm of what one learns with effort and which, however, is not forgotten once acquired.

In order to initiate the child to riding a bicycle, the most widespread method is to get him/her to ride a bicycle, for the first few years having two trainer wheels, usually applied to the sides of the rear drive wheel of the bicycle and parallel to said wheel, which allow a stable support of the bicycle on four wheels, i.e. the two large wheels and the two wheels which make up the stabilizers. The child thus learns to cycle, to brake and to swerve, with risks of falls being virtually negligible. Once the child is familiar with the simpler operations, the wheels are removed and the child is encouraged to ride without the trainer wheels, holding his/her bicycle upright upon start and then letting it go. This operation is more complex, it often implies falls of the child and it is not equally intuitive for every child; as a matter of fact, there are children who, upon being allowed to ride independently, do not understand that they must continue and tend to stop cycling, so that the fall is virtually guaranteed.

GB 265 490 relates to a safety device for motorcycles which provides a support wheel on a fork-shaped oscillating arm on both sides of the rear wheel. The two downward-curved arms are apt to oscillate vertically upwards and are retained downwards by spiral wings, thus helping to maintain ground contact of the rear wheel of the motorcycle. An arrangement of this type has no didactic usefulness.

FR 922 237 discloses a system of stabilizer wheels which can be attached and removed at will, with springs to maintain the wheels in the desired position (with or without stabilizer wheels) during the ride. The system allows to choose the desired degree of stability, but allows no adjustment of the wheel support: as a matter of fact, it limits itself to identify an operation position of the stabilizers and a home position for the stabilizers.

U.S. Pat. No. 2,793,877 discloses a system which provides a pair of wheels carried by respective flat springs, integral with two rigid shelves fastened to the bicycle frame, so that the wheel inclination may be adjusted during the ride, depending on the attitude and on the ground conditions.

U.S. Pat. No. 3,877,727 discloses a system comprising a pair of stabilizer wheels carried by supports on each side of the bicycle. The supports comprise a first shelf fastened to the frame, a second shelf which comes down from said first shelf, a third shelf which carries a circular terminal plate and which supports the wheel, the relative rotation between the second and the third shelf bringing the wheel between engagement position with the ground and a retracted, raised position.

U.S. Pat. No. 5,100,163 and U.S. Pat. No. 5,064,213 disclose a pair of stabilizer wheels carried by a square-shaped support, with a third elastic arm, which compensates the stresses in a diagonal direction.

A similar system is disclosed in U.S. Pat. No. 5,352,403, which relates to a system of stabilizer wheels, carried by a shelf consisting of three arms arranged trapetium-like, the last side of the trapetium being a spring element which, at one end, terminates on the arm carrying the trainer wheel. Thereby, the trainer wheel compensates riding irregularities.

WO95/09 759 discloses a dampener for articulated elements, having a first element articulated to a second element. The dampener has an elastic element, shaped so as to stay between the first and the second element, near the articulation region thereof and capable of engaging in an opposite manner with the first and the second element, so as to give a thrust to withstand the hinging of the first element towards the second element to dampen the movement of the first element towards the second element.

WO98/04 452 relates to an attachment for trainer wheels which may be removably fastened to the sides of the bicycle. The wheel support is bent, so as to thereby obtain the desired shape and size, such as, for example, a helical spring, so as to always maintain contact with the ground.

U.S. Pat. No. 6,331,012 discloses a pair of stabilizer wheels which has means for the height adjustment of the shelf which carries the wheel, which is introduced in the vertical portion of the support.

Finally, WO2005/061 317 discloses a system with two stabilizer wheels, carried by two square shelves, the two arms of which are articulated in a yielding, C-shaped structure which moves elastically, as a reaction to the stresses of the ride.

All the documents set forth above solve very well the problem of a stable ride, but are not particularly useful to learn to ride bicycles and motorcycles.

SUMMARY OF THE INVENTION

The object of the present invention is to provide a variable-attitude system applicable to stabilizer wheels, which allows a ride of a child's bicycle or mini-motorcycle in complete safety, representing at the same time a valid didactic tool to teach the child to ride a wheel-free bicycle. Such object is obtained, according to the present invention, through a variable-attitude system applicable to stabilizer wheels for children's bicycles and mini-motorcycles consisting of a metal arm, carried by the bicycle or mini-motorcycle frame, by a second metal arm and by a hinge joint, characterised in that at least a double-torsion spring is provided, housed around the joint which, through the two arms thereof, imparts a pressure which may be modulated on the second arm supporting the trainer wheel which adheres to the sliding plane.

Further embodiments and variants are reported in the dependent claims.

The present invention is now described in greater detail, with reference to the attached drawings briefly described below.

BRIEF DESCRIPTION OF THE FIGURES

FIGS. 5 to 20 represent alternative embodiments of the system according to the present invention.

DETAILED DESCRIPTION

Figure 1:
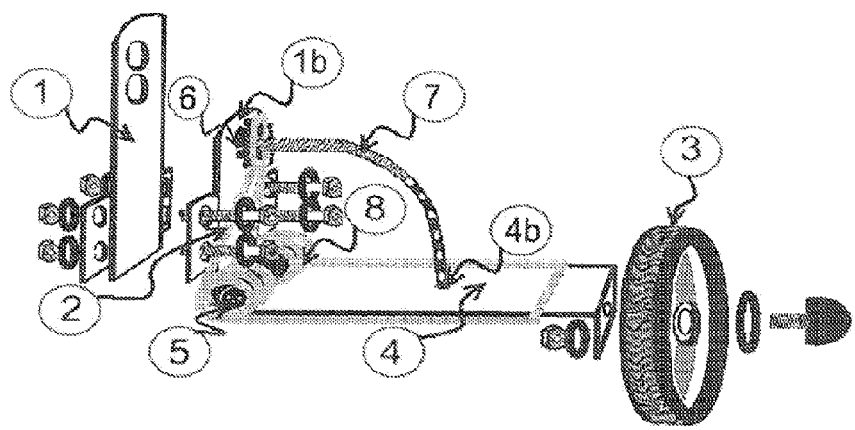
FIG. 1 is a schematic side view of a system according to the present invention, based on a first embodiment.
Figure 2:
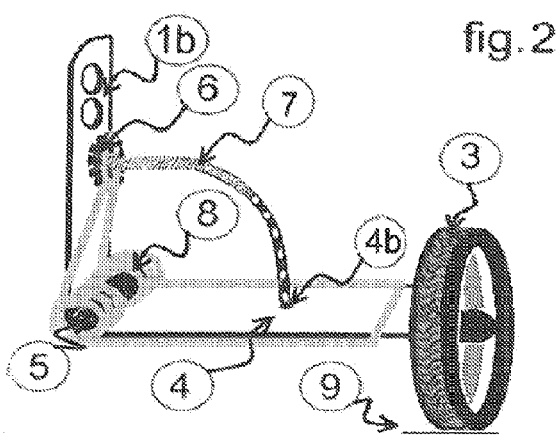
FIG. 2 is a schematic side view as claimed in FIG. 1, relative to a second embodiment of the present invention.
Figure 3:
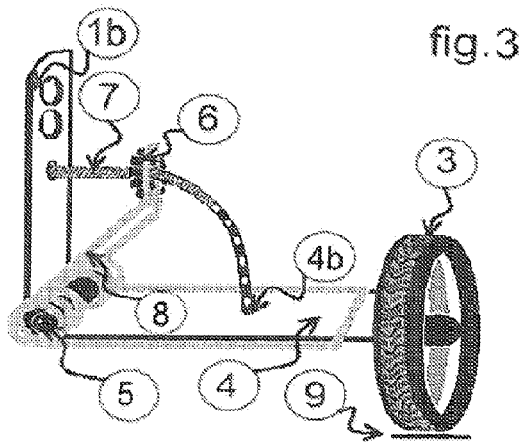
FIGS. 3 and 4 are views as claimed in FIG. 2, but in different phases of use of the system according to the present invention.

The system according to the present invention may be applied to children's bicycles and mini-motorcycles present on the market, reusing some parts of the stabilizers: the arm segment (1), which usually has specific features in the attachment which fastens it to the bicycle frame, may be reused sawing it in the angular part to then lock it in the screw engagement (2) of the system and the wheels (3) by screwing them to the other arm segment (4) (FIG. 1). Or the same system may be embedded in the newly manufactured stabilizers as shown in (FIG. 2). The wheels with this solution differ from those on the market in two features: the opportunity of adjusting the inclination of the arm (4) where the wheel is housed, which in this case is provided with a joint (5) (FIG. 1; 2) and the option of adjusting—at the same time with the aid of springs—the amount of support which the wheel itself must guarantee during running. This allows to progressively adapt the mechanism to the ability level of the child using it. As a matter of fact, by acting on the screw-type, tight-engagement or pressure-type knob (6) sliding along the pin (7), it is possible to increase or reduce the pressure of the spring (8) inserted therein which, pushing on the arm (4) where the wheel (3) is housed, causes the same to adhere to the sliding plane (9) (FIG. 3). This hence allows to modulate the support provided by the trainer wheels, depending on the ability gradually acquired by the child. The adjustable inclination of the arm supporting the wheel, not found in the systems according to the prior art or in any case not adjustable at the same time, allows to correctly use the bicycle or the mini-motorcycle during a curve from the very first moments giving also the opportunity of inclining and shifting the weight towards the curve trajectory, which traditional locked wheels do not. This inclination, supported by the strength which may be modulated of the springs (8), also allows to safely learn the resting of the foot, necessary in case of halt or excessive inclination, to prevent disastrous falls.

Figure 4:
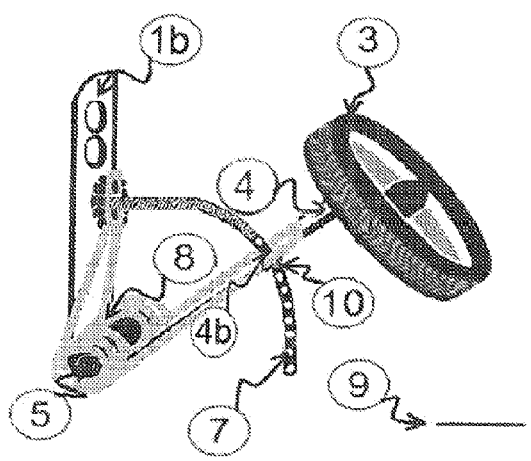
Figure 5:
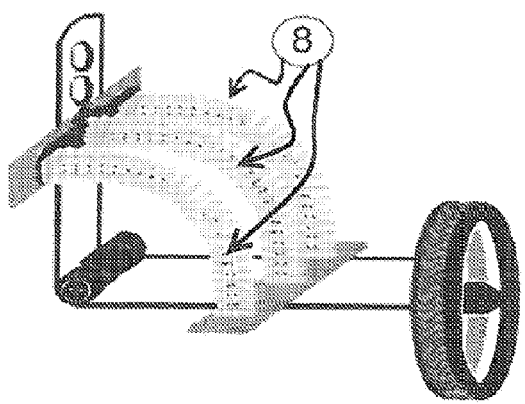
Figure 8:
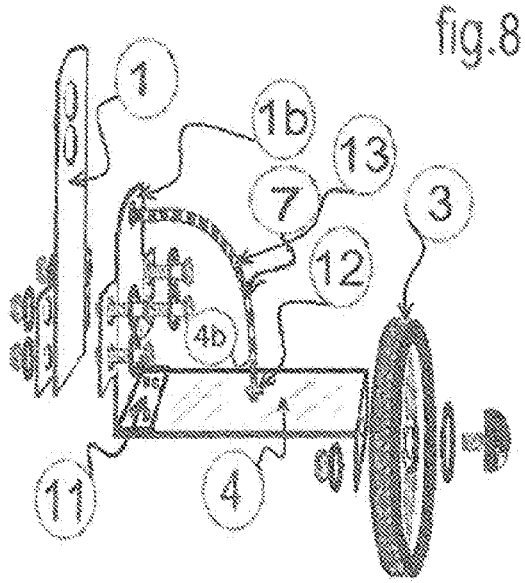
Figure 9:
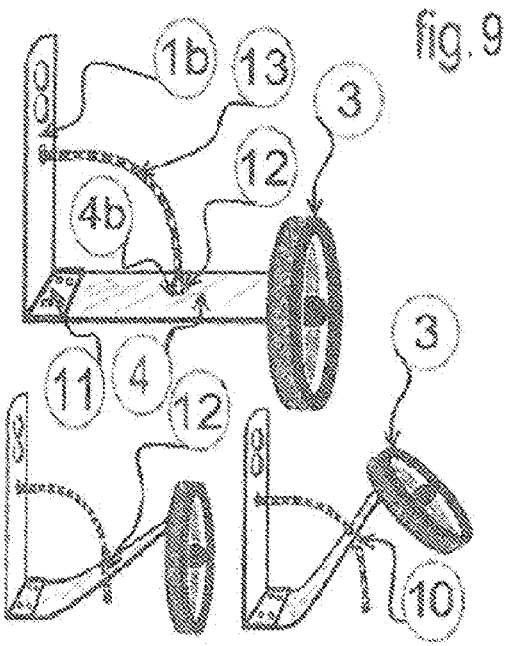

The opportunity of having the arm (4) housing the trainer wheel inclinable also allows to make the full removal of the stabilizer wheels (3) more straightforward, easy and progressive (3). In order to do that it is sufficient to act on the metal pin (10) arranged at the bottom of the spring (8) below the joint arm (4) and driven in the sliding pin (7) (FIG. 4). When the ability achieved by the child is such as to allow to fully shift the screw-type knob or tight-engagement knob or pressure-type knob (6), relieving all the pressure of the spring (8) (FIG. 2), progressively moving the pin (10) from hole to hole, the gradual raising of the wheel from the sliding plane (9) (FIG. 4) is obtained. Thereby the child has the opportunity to progressively get accustomed to the full absence of the support provided by the trainer wheels. Which support, however, remains available until the final removal with the achievement of the maximum ability, necessary for any excessively pronounced lateral inclinations which would lead to sure falls in the absence of the trainer wheels, even though raised. This system will be able to be manufactured, in addition to the one depicted in (FIGS. 6; 7) characterised by the use of a single compression spring (8), even with multiple compression springs (8) to be used in the number of two or three side by side, according to the child's weight and the size of the bicycle or mini-motorcycle (FIG. 5). In the system employing a single spring, the adaptation to the different sizes of bicycle and mini-motorcycle or child's weight will occur with the use of springs (8) with the construction wire having different thicknesses. Moreover, a version using double-torsion springs (8) will be manufactured, said springs being housed around joint (5) (FIGS. 1;2;3;4). However, this version will maintain all the other components unchanged and employed in the same manner. In a cheaper and more basic version, two systems without the joint (5) in the arm (4) will be built. In one the flexibility will be guaranteed building the segment of the arm supporting the wheel (3) of flexible foliated steel (FIGS. 8 and 9).

It may be anchored with screws (11) to the segment of arm (1b) (FIGS. 8; 9) which is fastened to the bicycle, made of soft iron. In the other one, resilience is accomplished by building the arms (1b) and (4) of the system exploiting the ends of a single-torsion or double-torsion spring (8) (FIGS. 10 and 11). These two versions of the system do not use the screw-type knob on the sliding pin, but only engagement pins or upper pressure pins (12) which will be shifted, every time, on the sliding pin (7) provided with through-holes (13) to increase the oscillation of the trainer wheels (FIG. 9) and (FIG. 11).

Figure 6:
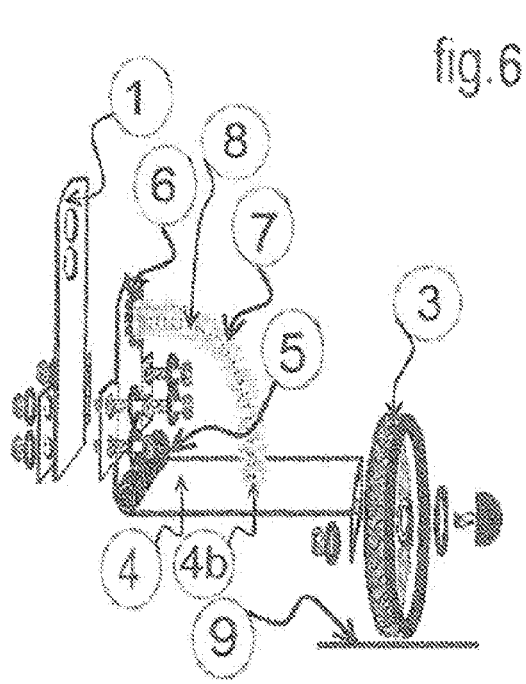
Figure 7:
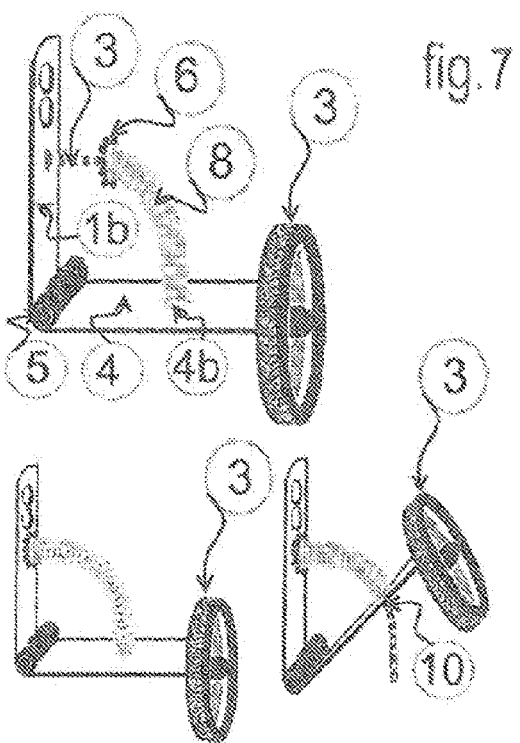

Therefore, in these cases, the resistance to the oscillations of the bicycle—entrusted to the foliated steel arm and to the arm supporting the trainer wheel of the double-torsion spring—will not be adjustable and the increase of the arm excursion, for progressive learning, will be controlled only by shifting the upper engagement pins (12) or the pressure pins (FIG. 9) and (FIG. 11) upwards, step by step. The progressive removal of the support of the trainer wheels from the sliding plane will be entrusted—as in all other versions—to the metal pin (10) arranged below the arm (4) (FIG. 9) and (FIG. 11). It will be possible to manufacture—in a more expensive combination and only for complete trainer wheels—two further versions: one with pressure springs (8) (FIG. 12) and one with the arm segment (1c) made of flexible foliated steel (FIG. 13). The first one will have the joint (5) arranged on top, to be fastened to the arm (14), and the sliding pin (7) (FIG. 12) applied opposite to the model in (FIG. 2). The pressure spring (8), the knob (6) and the pin (10) (FIG. 12), arranged differently, will be employed in the same way as (FIGS. 6,7). The second version, in addition to the foliated steel arm (1b), fastened still above, to the arm (14) through bolts (11), will have the sliding pin (7) (FIG. 13) applied in the opposite way with respect to the previous version. The pins (10) and (12), through the holes (13) of the sliding pin (7) (FIG. 13), will be employed as in the version with the arm (4) made of foliated steel (FIG. 9).

Figure 18:
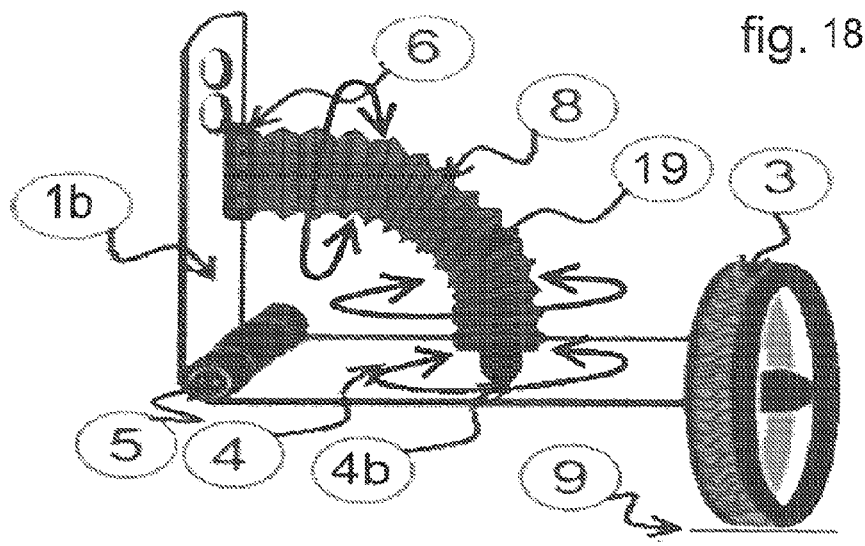
Figure 19:
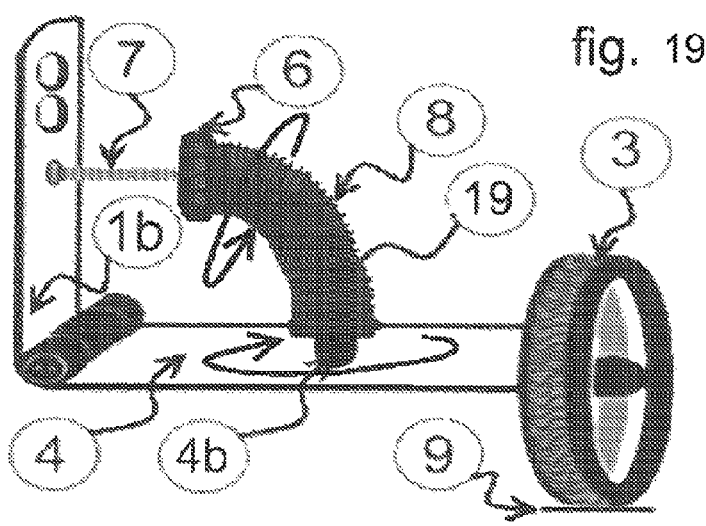
Figure 20:
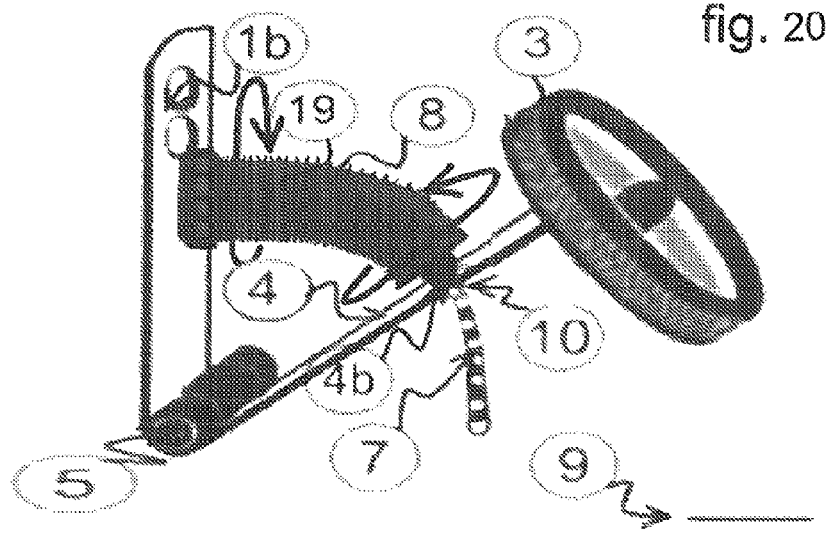

A further embodiment, shown in FIGS. 18 to 20, is structured like the one already illustrated in (FIG. 7). It differs from the embodiments previously described, firstly, due to the fact that the compression spring (8) is embedded in bellows (19) and is anchored to the semi-rigid plastic they are made of, secondly, due to the fact that the adjustment knob (6) is replaced by a metal threaded nut, itself also embedded and anchored to the bellows plastic, so as to make up, thus, a single assembly (threaded nut, spring and bellows) used entirely as adjustment knob, as shown by the arrows in (FIGS. 18 to 20).

A further embodiment, despite maintaining almost all the structural features and all the modes of use of the embodiments described before, is conceived—as regards the operation thereof—to be almost entirely folded on itself. This in order to minimize the side hindrance to increase the distance of the trainer wheels from the sliding plane, as already occurs in the other versions. In this embodiment the pin (7) is straight, as in other embodiments, but always drilled, along half of the length thereof, to allow the progressive raising of the trainer wheel (3) from the sliding plane (9) through the shifting of the pin (10), and supports a pressure spring (8) embedded in the bellows (19) (FIGS. 14 to 17) provided with threaded nut to form a single assembly, exactly as the adjustment knob described in the previous version.

Figure 14:
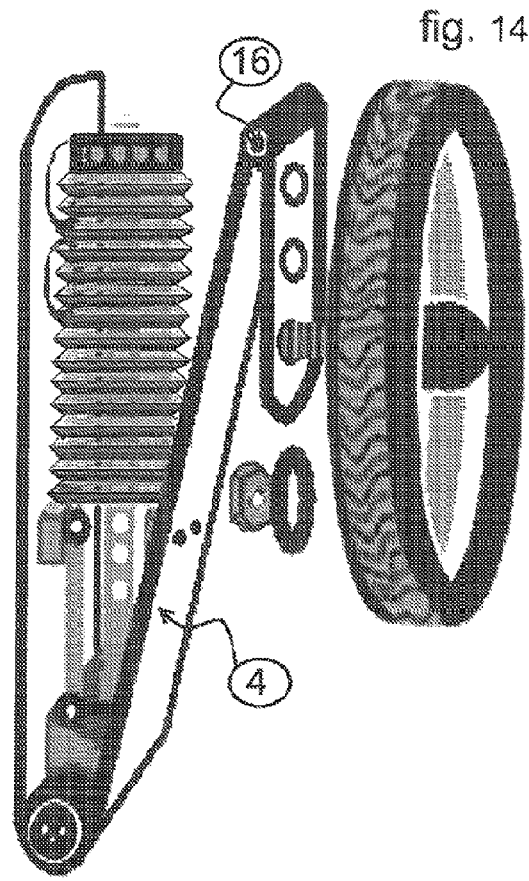
Figure 15:
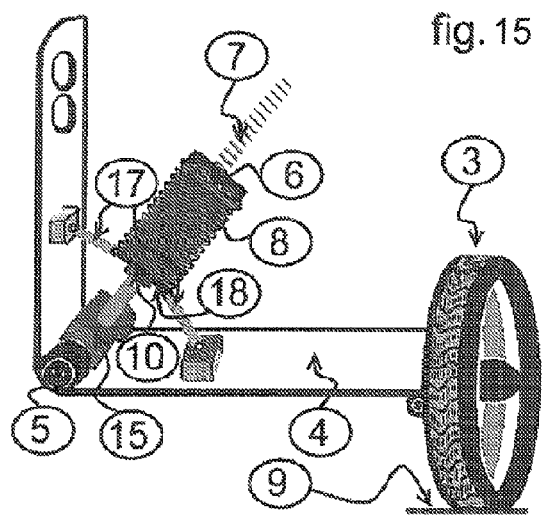
Figure 16:
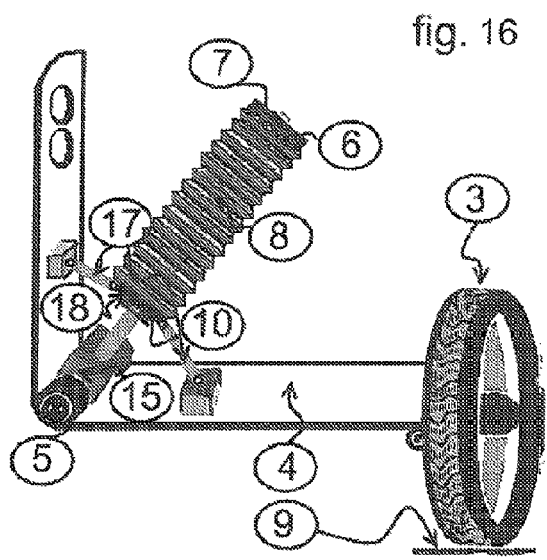
Figure 17:
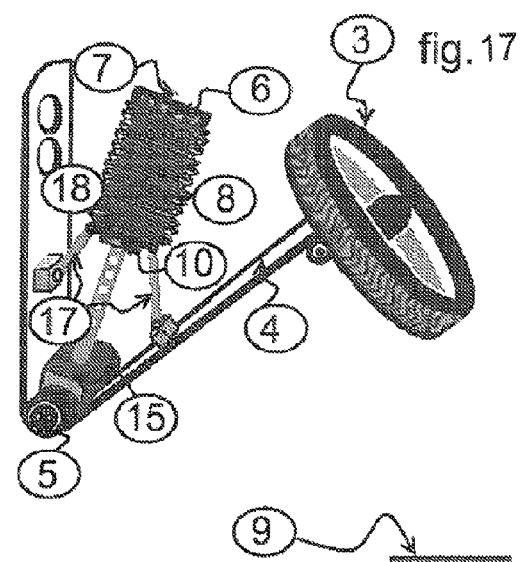

In order to further increase the distance of the wheel (3) from the sliding plane (9), going beyond what is allowed by the shifting of the pin (10), this embodiment also provides a snap hinge (16) arranged on the furthest part of the arm (4), the one folded at 90° on which the trainer wheel (3) is screwed (FIG. 14).

Finally, it is possible to provide that on the arm segment (4) a hole in the shape of a slit be provided, suitably shaped to allow the pin (7) to slide within the hole so as to adjust the pressure of the springs and the raising of the trainer wheels.

The present invention has so far been disclosed with reference to preferred embodiments thereof. However, it is evident that the preceding description is given purely as an example and limits in no way the scope of protection of the present invention, which is defined by the attached claims and that within it many variants are possible for the person skilled in the field, without departing from said scope.

The invention claimed is:

1. A variable-attitude system applicable to stabilizer wheels in the form of training wheels for children's bicycles and mini-motorcycles, comprising
a first metal arm, carried by the bicycle or mini-motorcycle frame, a second metal arm and a hinge joint,
wherein elastic elements are provided which, through the first and second arms, imparts a pressure which may be modulated on the second arm which supports a training wheel of the training wheels to adhere to a sliding plane, and wherein on the second arm a hole is provided suitably shaped to allow a sliding pin to slide within the hole so as to adjust the pressure of the elastic elements and the raising of the stabilizer wheels,
wherein said elastic elements comprise a double-torsion spring or a single compression spring,
wherein said system furthermore comprises suitable screw knob, tight-engagement knob, or pressure knob, which slides along the sliding pin between said first arm and said single compression or double-torsion spring, which is configured for increasing or decreasing the pressure of the spring, pushing on the second arm where the training wheel is housed, and causing the adhesion thereof to the sliding plane.

2. The system of claim 1, wherein said system comprises a metal pin, arranged at the bottom of the single compression or double-torsion spring below the second arm and caused to engage with the sliding pin, to allow it to gradually release the pressure of the spring, and to raise the arm stepwise.

3. The system of claim 2, wherein the ends of said compression or double-torsion spring slide along the pin to adjust the pressure of the trainer wheel on the sliding plane.

4. The system of claim 1, comprising under the second arm which supports the training wheel, on the sliding pin a stop to progressively raise the wheel from the sliding plane.

5. The system of claim 1, wherein said elastic elements comprise a segment of the second arm which supports the wheel.

6. The system of claim 1, wherein the joint is arranged between a first arm segment and a second arm segment, built integrally with the second arm.

7. The system of claim 1, wherein said elastic elements comprise the compression spring and the compression spring is integrated in bellows made of made of semi-rigid plastic and is anchored to the semi-rigid plastic of said bellows.

8. The system of claim 1, wherein the sliding pin is drilled along half of the length thereof, to allow the progressive raising of the trainer wheel from the sliding plane through the shifting of the metal pin and supporting a pressure spring integrated in bellows equipped with a threaded nut to form an assembly.

9. The system of claim 8, wherein in order to further increase the distance of the wheel from the sliding plane, going beyond what is allowed by the shifting of the pin, a snap hinge is provided on the furthest part of the arm, on which the trainer wheel is screwed.

* * * * *